(12) United States Patent
Yeung (10) Patent No.: US 6,466,284 B1
(45) Date of Patent: Oct. 15, 2002

(54) REFLECTIVE MIXED-MODE TWISTED NEMATIC LIQUID CRYSTAL DISPLAY

(75) Inventor: Steve Wai-Leung Yeung, Tseung Kwan O (HK)

(73) Assignees: Varintelligent (BVI) Limited, Tortola (VG); Terence Leslie Johnson, London (GB)

( * ) Notice: Subject to any disclaimer, the term of this patent is extended or adjusted under 35 U.S.C. 154(b) by 0 days.

(21) Appl. No.: 09/390,920

(22) Filed: Sep. 7, 1999

(30) Foreign Application Priority Data

| Sep. 8, 1998 | (GB) | 9819672 |
| Sep. 15, 1998 | (GB) | 9820099 |
| Feb. 8, 1999 | (GB) | 9902786 |
| Apr. 19, 1999 | (GB) | 9908948 |

(51) Int. Cl.$^7$ .................. G02F 1/1347; G02F 1/1335
(52) U.S. Cl. .................................. 349/76; 349/96
(58) Field of Search .................. 349/76, 180, 181, 349/96, 113

(56) References Cited

U.S. PATENT DOCUMENTS

| 4,952,030 | A | * | 8/1990 | Nakagawa et al. | 350/337 |
| 5,296,955 | A | | 3/1994 | Tsujioka | 349/117 |
| 5,555,113 | A | * | 9/1996 | Mulkens et al. | 349/96 |
| 5,926,245 | A | * | 7/1999 | Kwok et al. | 349/180 |
| 5,933,207 | A | | 8/1999 | Wu | 349/99 |
| 5,940,155 | A | | 8/1999 | Yang et al. | 349/120 |
| 6,091,477 | A | * | 7/2000 | Kwok et al. | 349/180 |

FOREIGN PATENT DOCUMENTS

EP 0 571 996 5/1993

OTHER PUBLICATIONS

Kuo, Chen–Lung et al, *Reflective Direct–View Display Using A Mixed–mode Twisted Nematic Cell*, Mar. 1997, vol. 36, No. 3A, pp. 1077–1080, XP–000732301.
Wu, S.–T. et al, *P–42: Optimization of Mixed–Mode LC Cells for Reflective Displays*, May, 1997, vol. 28, pp. 643–646, XP–000722780.
Wu, Shin–Tson et al, *Mixed–mode Twisted Nematic Liquid Crystal Cells for Reflective Displays*, Mar. 1996, vol. 68, No. 11, pp. 1455–1457, XP–000582318.

* cited by examiner

Primary Examiner—William L. Sikes
Assistant Examiner—Dung Nguyen
(74) Attorney, Agent, or Firm—Flynn, Thiel, Boutell & Tanis, P.C.

(57) ABSTRACT

The invention relates to reflective mixed-mode twisted nematic liquid crystal displays. A direct-view display consists of a front substrate, a polarizer, liquid crystal and a rear substrate having a reflective coating. The twist angle, polarizer angle and retardation are optimized and fall within the following ranges: twist angle of between 67° and 83°; polarizer angle of between 5° and 21° or between 95° and 111°; and retardation of between 0.18 and 0.28. An alternative configuration for the display is a projection display having a front substrate, a rear substrate with a reflective coating, liquid crystal between the substrates, a polarizing beam splitter and a screen.

8 Claims, 9 Drawing Sheets

REFLECTIVE MIXED-MODE TWISTED NEMATIC LIQUID CRYSTAL DISPLAY

The present invention relates to reflective mixed-mode twisted nematic liquid crystal displays, and mote particularly to such displays with an optimised twist angle, polariser angle and retardation.

Reflective-mode liquid crystal displays (LCDs) are known to offer various advantages compared with transmissive-mode liquid crystal displays. Reflective-mode liquid crystal displays have a lower power consumption, are more easily readable in sunlight, have a thinner profile and weigh less.

Transmissive-mode matrix liquid crystal displays with back-light illumination commonly use a 90° twisted nematic cell. Such cells work by the mechanism of polarisation rotation to provide the electro-optic effect. An incoming linearly polarised light follows the twist of the LC directors. Therefore, when light has traversed the cell, its polarisation axis is rotated by approximately 90°, and the light is transmitted by a crossed polariser.

When such transmissive-mode twisted nematic cells are employed in reflective displays, poor brightness and low resolution result. The poor brightness is caused by the light passing through the crossed polariser twice, and the low resolution is caused from the parallax which is due to the thickness of the polariser sitting between the liquid crystal cell and the reflecting mirror.

Shin-Tson Wu et al describe in the paper "Mixed-Mode Twisted Nematic Liquid Crystal Cells for Reflective Displays", Applied Physics Letters 68(11), Mar. 11, 1996, pages 1455-1457, an improved reflective-mode display called a mixed-mode twisted nematic cell. Although the arrangement proposed by Wu et al is advantageous in that it improves the brightness and eliminates the parallax caused by using a transmissive twisted nematic cell, the arrangement proposed does not provide the optimum performance.

The present invention is concerned with improving the performance of reflective mixed-mode twisted nematic liquid crystal displays.

According to the present invention there is provided a reflective mixed-mode twisted nematic liquid crystal display having a twist angle of between 67° and 83°, a polariser angle of between 5° and 111°, and a retardation of between 0.18 and 0.28.

The polariser angle may suitably comprise a plurality of ranges suitably from 5° to 21° and from 95° to 111°.

In one arrangement the twist angle is 76°±3°, the polarised angle is 18°±3° and the retardation is 0.25±0.03. In this arrangement, preferably, the twist angle is 76°, the polariser angle is 18° and the retardation is 0.25.

In another arrangement, the twist angle is 70°±3°, the polariser angle is 8°±3° and the retardation is 0.21°±0.03. In this arrangement, preferably, the twist angle is 70°, the polariser angle is 8° and the retardation is 0.21.

In a further arrangement, the twist angle is 80°±3°, the polariser angle is 16°±3° and the retardation is 0.23 ±0.03. In this arrangement, preferably, the twist angle is 80°, the polariser angle is 16° and the retardation is 0.23.

The polariser angle may be 98°, 108° or 106°, each ±3°. In each case the retardations may respectively be 0.21, 0.25 and 0.23. The optical performance of devices incorporating such polariser angles is similar to or identical to that rotation of the polariser through the above values minus 90°, namely on 8°, 18° or 16° polariser angle.

The display may comprise a polariser, a liquid crystal cell and reflecting means, and may be a direct-view display.

Alternatively, the display may comprise a polarising beam splitter, a liquid crystal cell and reflecting means. This type of display is usually a projection display.

For a better understanding of the present invention, embodiments will now be described by way of example, with reference to the accompanying drawings, in which.

Mixed-mode twisted nematic liquid crystal displays may be used in a direct-view or projection configuration. By adjusting the cell parameters, both normally white and normally black cells can be obtained. The normally white/black direct view application using a single polariser corresponds to the normally black/white projection application using a polarising beam splitter.

Figure 1:
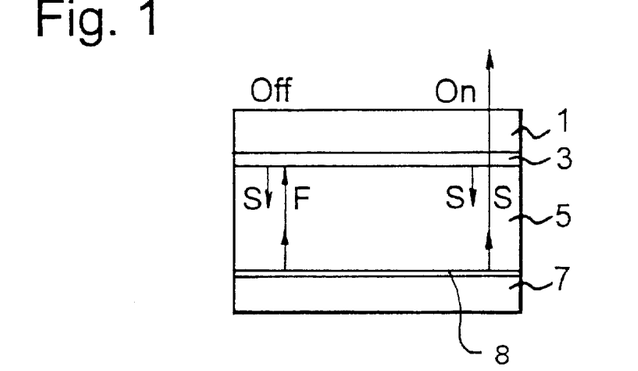
FIG. 1 is a schematic diagram of a normally black direct-view reflective liquid crystal display.

FIG. 1 shows a schematic diagram of normally black direct-view reflective liquid crystal display. However, it should be understood that direct-view displays do not have to be normally black and use a polariser. The display comprises a front substrate 1, a single polariser 3, liquid crystal 5 and a rear substrate 7 having a reflective coating thereon.

Incident light is linearly polarised by the polariser 3. In the "off" state, the twist and birefringence of the liquid crystal 5 induce a 90° change in the state of polarisation of the reflected light. The reflected light is subsequently blocked by the polariser, which produces a dark image. In the "on" state, the state of the polarisation of the incident light is not changed and the reflected light is allowed to pass through the polariser to produce a bright image. FIG. 1 shows both the "off" and "on" states.

Figure 2:
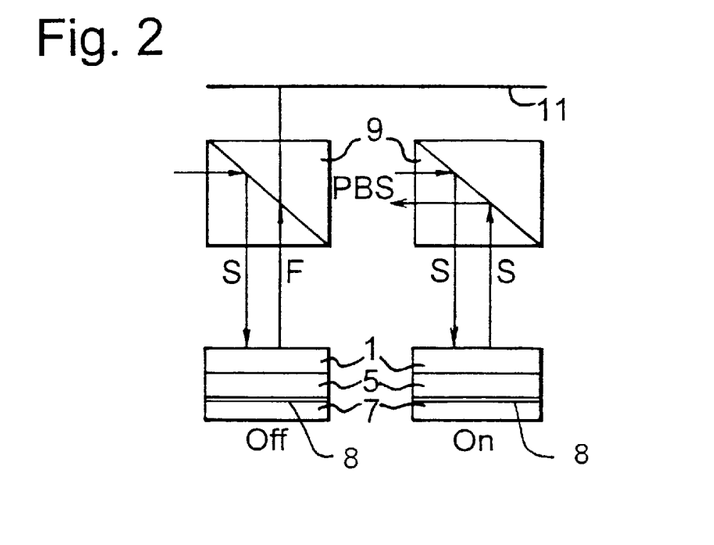
FIG. 2 is a schematic diagram of a normally white projection reflective liquid crystal display.

FIG. 2 shows a schematic diagram of a normally white projecting reflective liquid crystal display. Compared with the arrangement of FIG. 1, the polariser 1 is replaced with a polarising beam splitter 9. However, it should be understood that projection displays do not have to be normally white and use a polar beam splitter. The angle of the liquid crystal director to the polarising beam splitter 9 is the same as the angle to the polariser 3 in FIG. 1. Incident light is polarised linearly by reflecting off a cube prism polariser comprising the polarising beam splitter 9, and is directed to the liquid crystal 5, which is the same as the liquid crystal 5 of the FIG. 1 arrangement. The light is reflected back by the rear substrate 7, having a reflective coating, which is the same as the rear substrate 7 of the FIG. 1 arrangement. In the "off" state, a 90° change in the state of polarisation is induced in the light reflected from the rear substrate 7. The reflected light is able to pass through the polarising beam splitter, which produces a bright image on screen 11. In the "on" state, the state of polarisation of the reflected light is unchanged. The light is subsequently reflected by the polarising beam splitter back in the direction of the incoming light, thereby producing a dark image on the screen 11. FIG. 2 shows the arrangement for both the "off" and "on" states.

It should be noted that the normally white mode using a polarising beam splitter can also be employed in direct-view applications.

The discussion below assumes a normally white (i.e. white in the "off" state) projection display.

In a normally white projection application, the brightness of the "off" state is dependent upon the birefringence of the liquid crystal. Therefore, precise tuning of the cell parameters is imperative.

The present embodiments seek to achieve (1) maximum contrast, (2) uniformity of response to different wavelengths (broadness of band), and (3) insensitivity of response to cell gap variation.

In both the direct-view and projection configurations, uniformity of cell response to different wavelengths is important in colour sequential applications, where the signals for three colours are multiplexed in time. Colour sequential applications require one single broad band cell.

In prior art mixed-mode twisted nematic liquid crystal displays, performance is very sensitive to variations in the cell gap, and this is why it is particularly important for the embodiments of the present invention to provide insensitivity of performance to cell gap variation. The retardation of a liquid crystal display is defined as the product of cell gap and birefringence of the liquid crystal.

Figure 3:
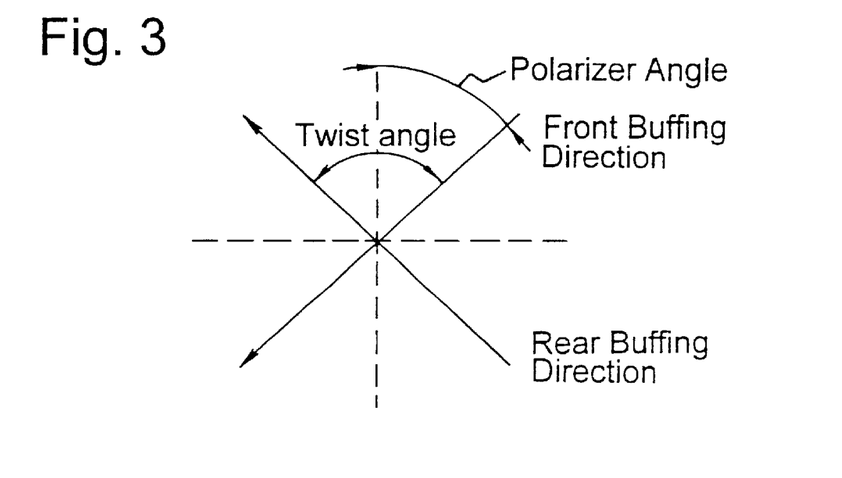
FIG. 3 shows the definitions of twist angle and polariser angle for a mixed-mode twisted nematic liquid crystal display.

FIG. 3 shows the definition of the twist angle and polariser angle parameters for a mixed-mode twisted nematic liquid crystal display. The twist angle is the difference between the alignment directions at the front and rear surfaces of the mixed-mode twisted nematic cell. Polariser angle is the angle between the alignment direction of the front surface of the mixed-mode twisted nematic cell and the polarisation axis.

To achieve insensitivity of response to retardation variation, a performance measure is developed. The retardation is allowed to vary for ±0.01 and the integral difference between the two response curves is obtained. Let $R_r(\lambda)$ be the reflectance of the LCDs at retardation r, measured at wavelength $\lambda$. We define $$\Phi(r) = \int_{\lambda=400nm}^{700nm} R_r(\lambda)d\lambda$$

as a measure of brightness at the "off" state. The sensitivity of spectral performance to retardation variation at a particular retardation value is defined as $$\Omega(r)=|\Phi(r+0.01)-\Phi(r-0.01)|$$

Notice that for the "off"-"on" transition simulation, reflective mode with one single ideal polariser is used to emulate the use of a polarising beam splitter. This results in an optical inversion (dark state becomes bright and vice versa).

Three configurations have been derived which give good "off" state brightness and "on" state darkness, insensitivity to retardation variation, and excellent uniformity in frequency response. They are as follows:

(1) 76°±2° twist angle, 18°±2° polariser angle, and 0.25±0.02 retardation (abbreviated as 76,18,0.25 mode)

(2) 70°±2° twist angle, 8°±2° polariser angle, and 0.21±0.02 retardation (abbreviated as 70,8,0.21 mode)

(3) 80°±2° twist angle, 16°±2° polariser angle, and 0.23±0.02 retardation (abbreviated as 80,16,0.23 mode)

The 76, 18, 0.25 mode (1)

Figure 4:
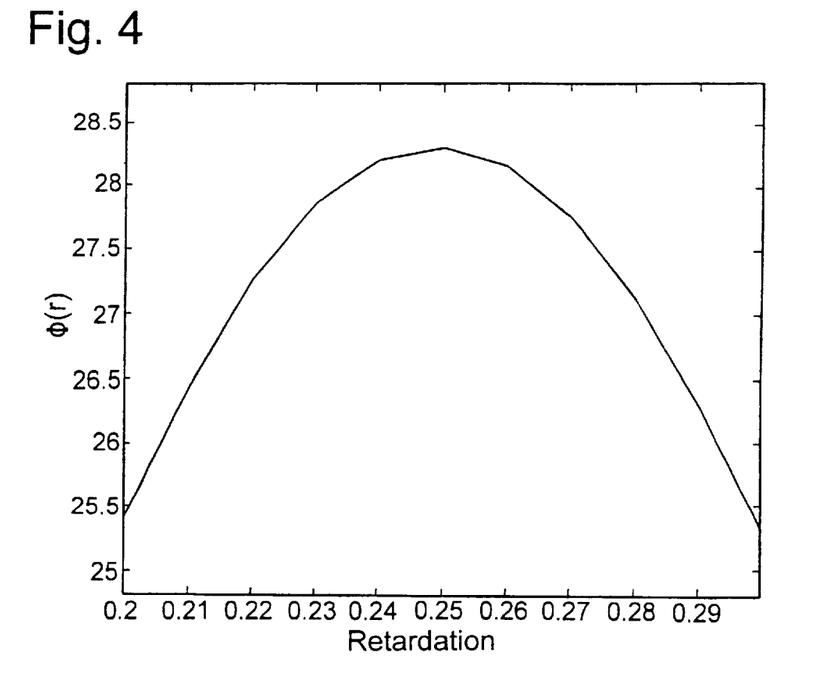
FIG. 4 shows a plot of retardation against integrated reflectance at all wavelengths of a display according to a first embodiment of the present invention, where the twist angle is 76°, the polariser angle is 18° and the retardation is 0.25.
Figure 5:
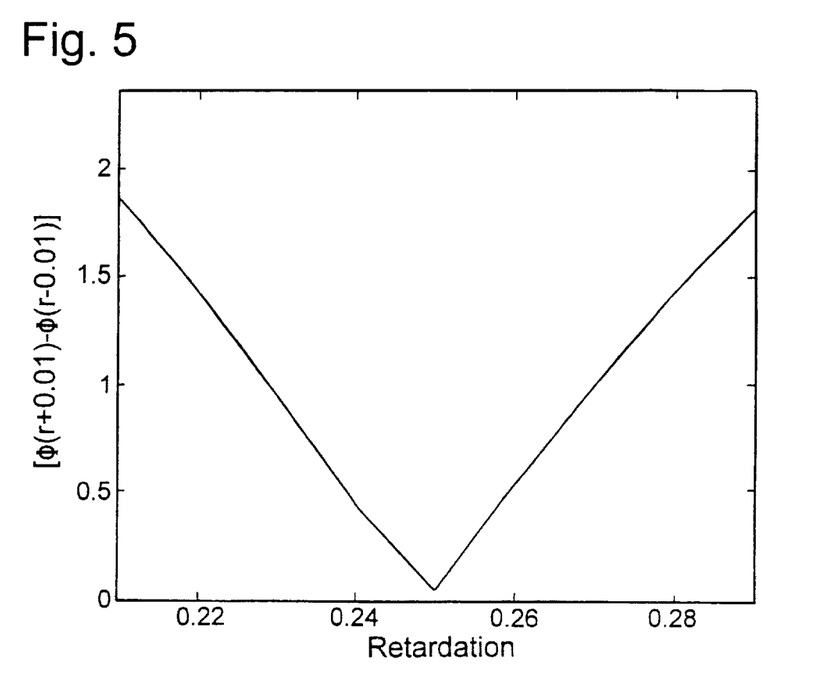
FIG. 5 is a plot of retardation against sensitivity to retardation variation for the first embodiment of the present invention.
Figure 6:
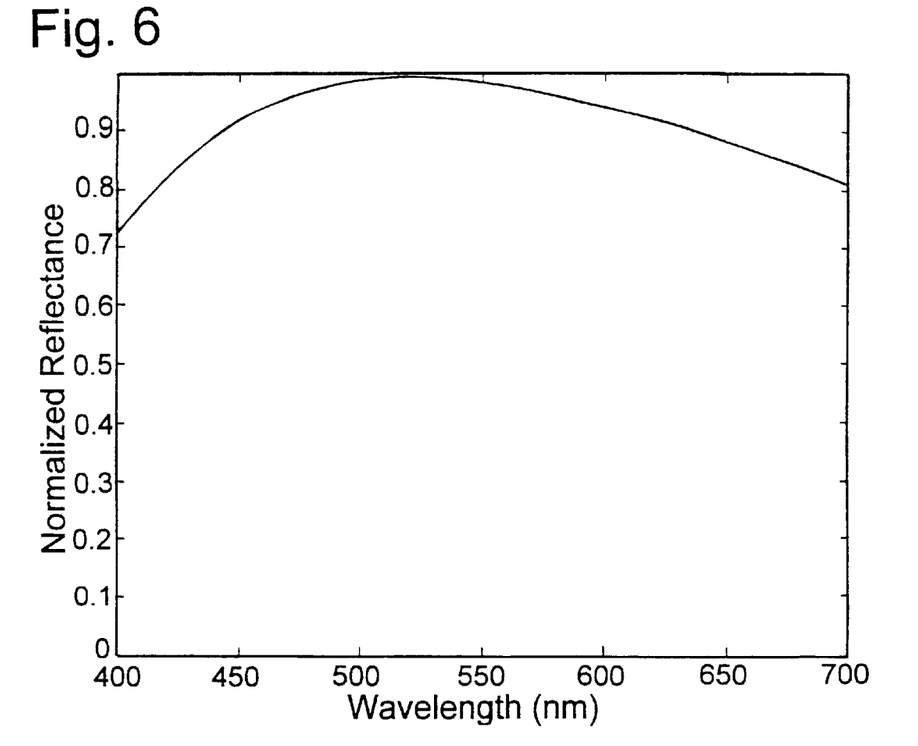
FIG. 6 is a plot of wavelength against reflectance for a display of the first embodiment of the present invention.
Figure 7:
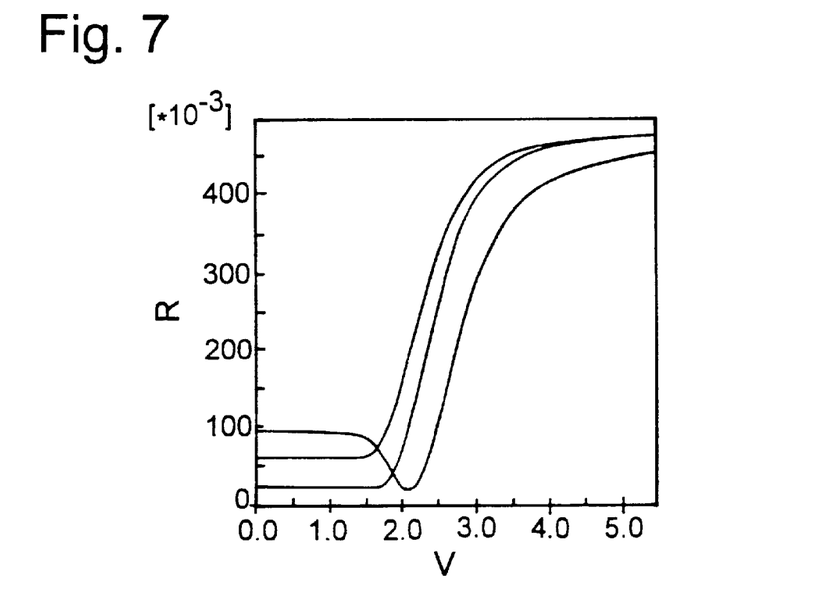
FIG. 7 shows "off"-"on" transition curves for three colours for the display according to the first embodiment of the present invention.
Figure 8:
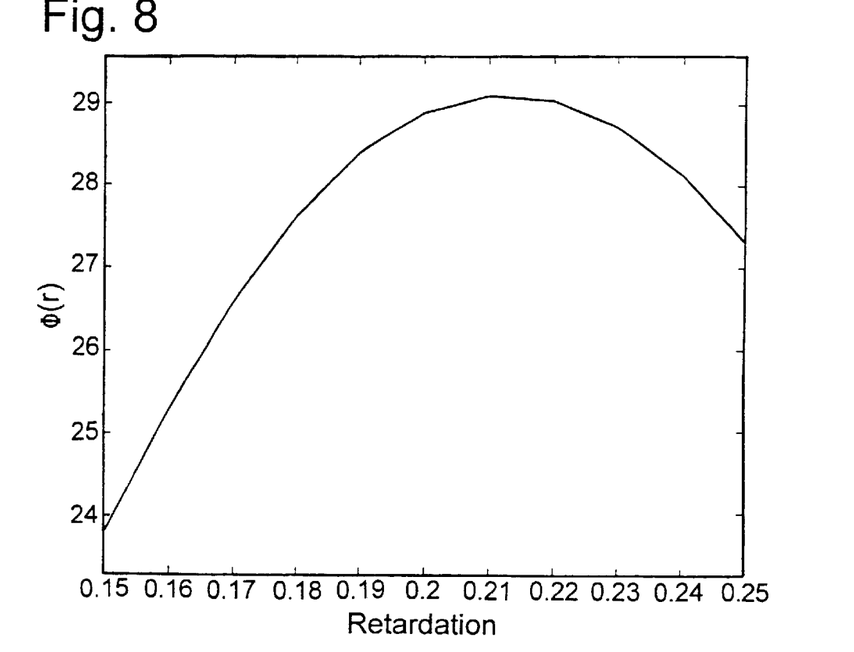
FIG. 8 shows a plot of retardation against integrated reflectance at all wavelengths for a display according to a second aspect of the present invention, where the twist angle is 70°, the polariser angle is 8° and the retardation is 0.21.
Figure 9:
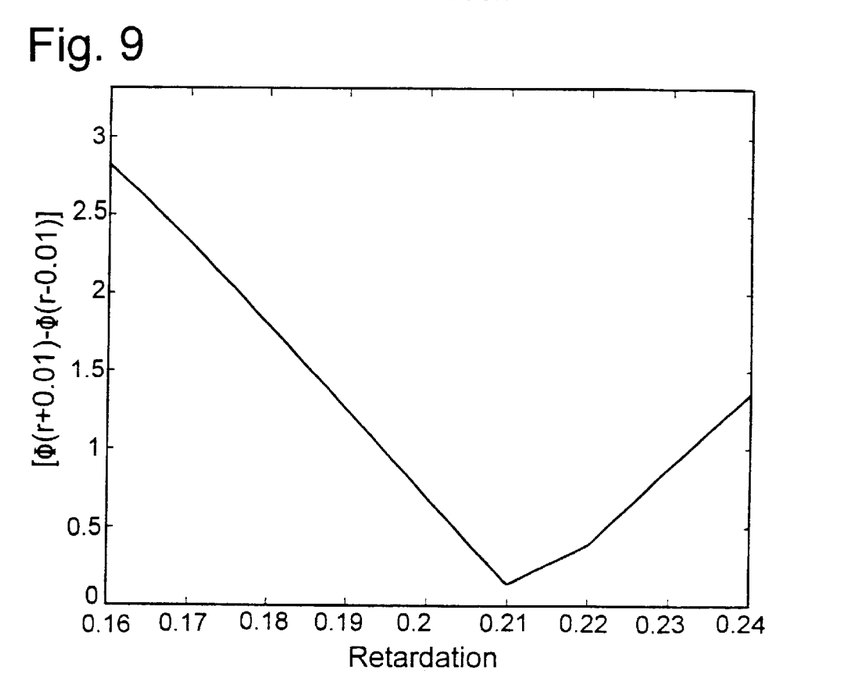
FIG. 9 is a plot of retardation against sensitivity to retardation variation for the second embodiment of the present invention.
Figure 10:
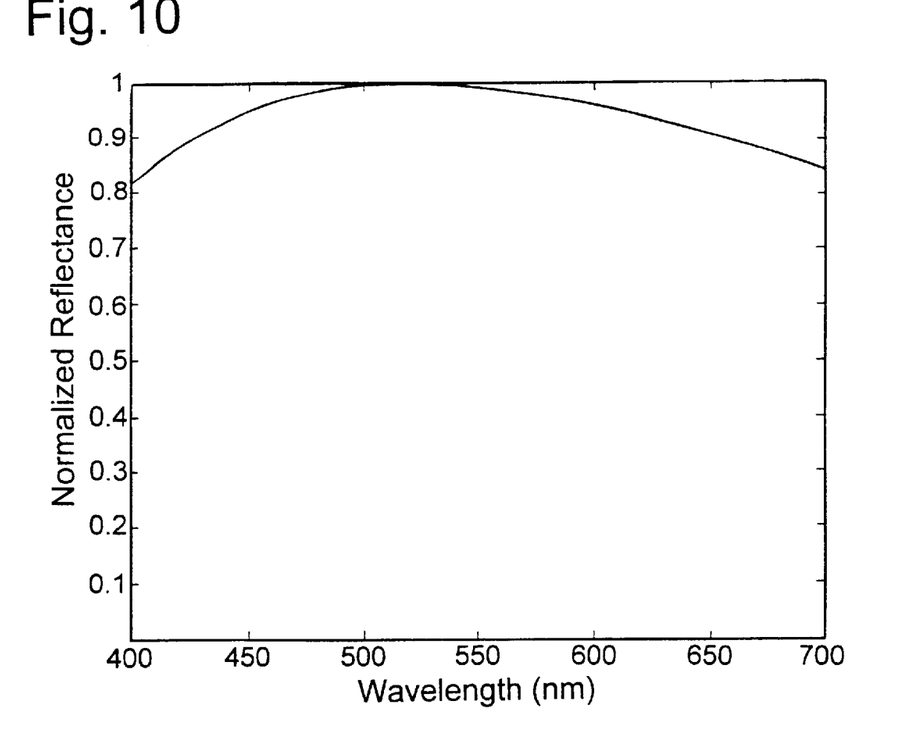
FIG. 10 is a plot of wavelength against reflectance for a display of the second embodiment of the present invention.
Figure 11:
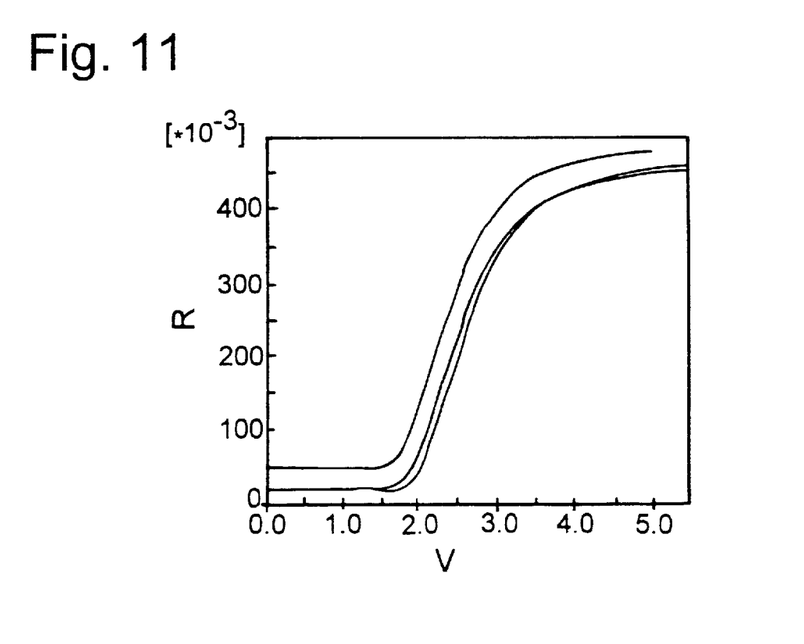
FIG. 11 shows "off"-"on" transition curves for three colours for the display according to the second embodiment of the present invention.

For the 76° twist angle, 18° polariser angle mode, cells with different retardation (0.20–0.30, 0.01 step) are simulated. FIG. 4 and 5 show respectively $\Phi(r)$ and $|\Phi(r+0.01)-\Phi(r-0.01)|$. From FIGS. 4 and 5, the maximum of $\Phi(r)$ and the minimum of $|\Phi(r+0.01)-\Phi(r-0.01)|$ occur at the retardation value 0.25. This retardation value corresponds to the maximum "off" state brightness and minimum sensitivity to retardation variation according to the above definition. FIG. 6 shows the plot of wavelength against normalised reflectance for the 76,18,0.25 mode, FIG. 7 shows the "off"-"on" transition curves for the three wavelengths 450 nm, 550 nm, and 650 nm. Notice the optical inversion in FIG. 7. The 70,8,0.21 mode (2) FIGS. 8 and 9 show respectively $\Phi(r)$ and $|\Phi(r+0.01)-\Phi(r-0.01)|$ for retardation values $0.15 \leq r \leq 0.25$. We observe that the maximum of $\Phi(r)$ and the minimum of $|\Phi(r+0.01)-\Phi(r-0.01)|$ occur at the retardation value 0.21. The value corresponds to maximum "off" state brightness and minimum sensitivity to retardation variation according to our criteria. FIG. 10 shows the wavelength against reflectance plot for the quiescent state while FIG. 11 shows the "off"-"on" transition curves. Notice the optical inversion in FIG. 11.

The 80,16,0.23 mode (3)

Figure 12:
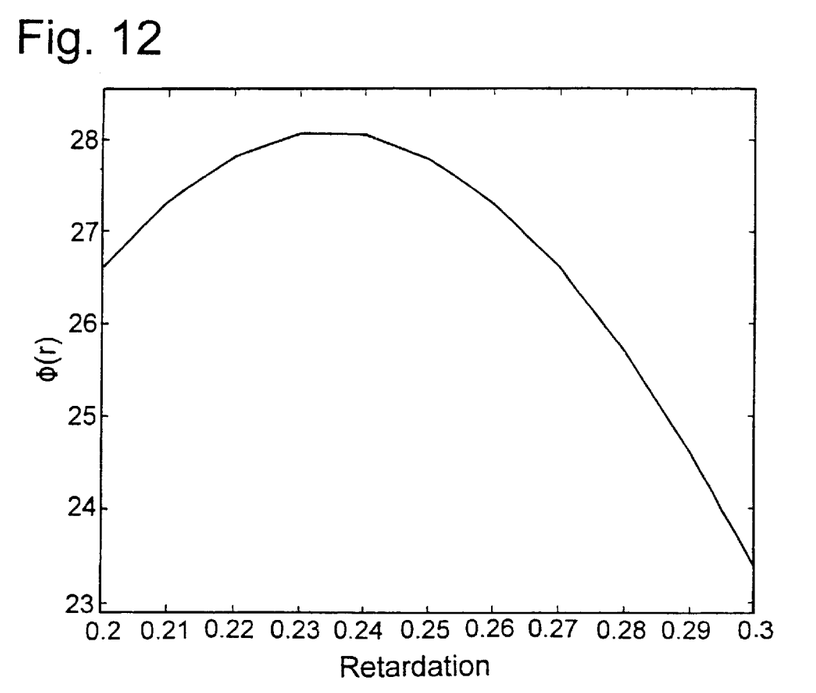
FIG. 12 shows a plot of retardation against integrated reflectance at all wavelengths for a display according to the third embodiment of the present invention, where the twist angle is 80°, the polariser angle is 16° and the retardation is 0.23.
Figure 13:
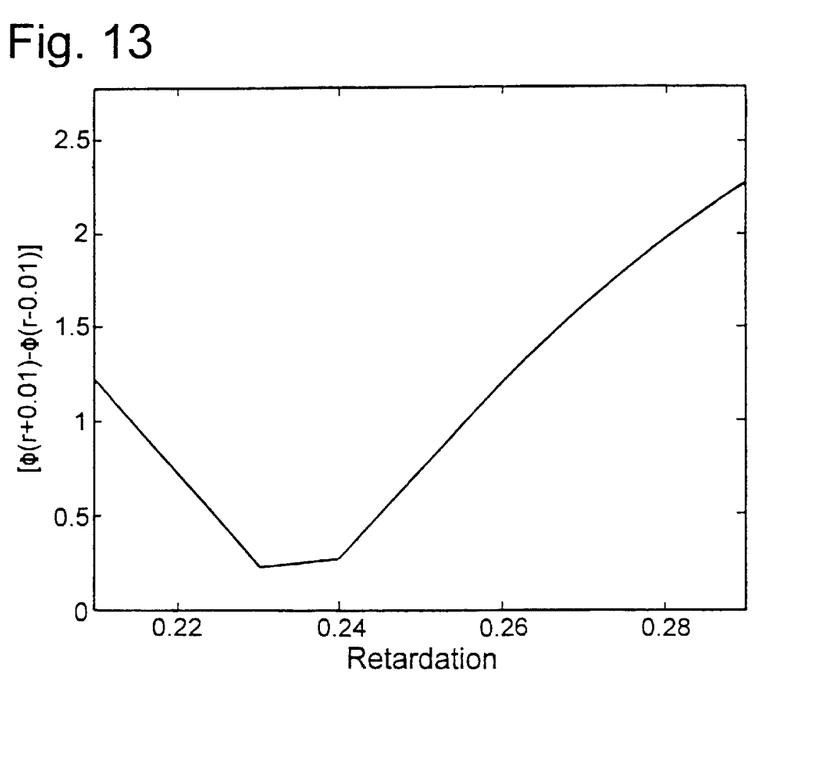
FIG. 13 is a plot of retardation against sensitivity to retardation variation for the third embodiment of the present invention.
Figure 14:
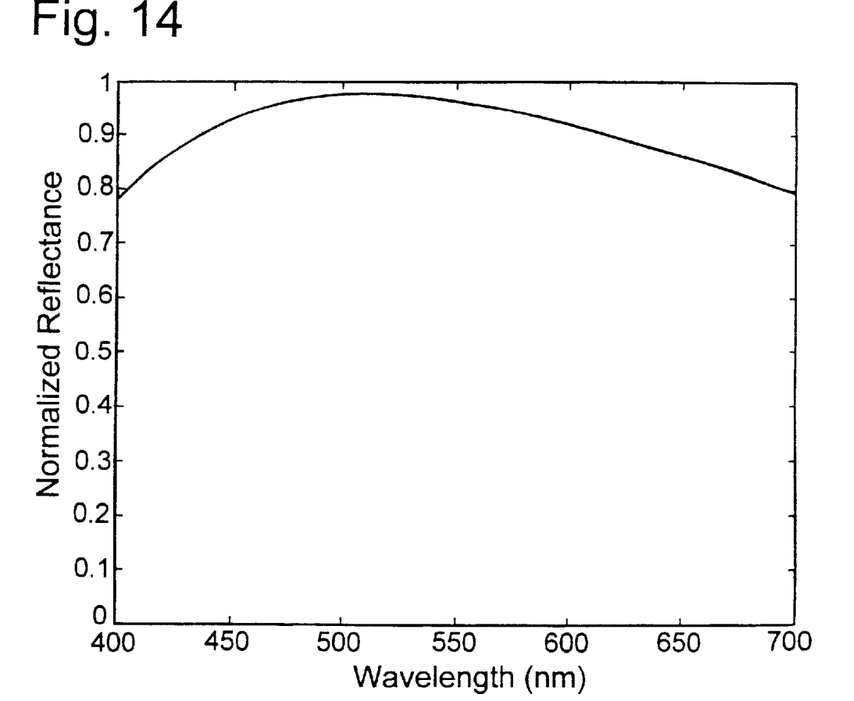
FIG. 14 is a plot of wavelength against reflectance for a display of the third embodiment of the present invention.
Figure 15:
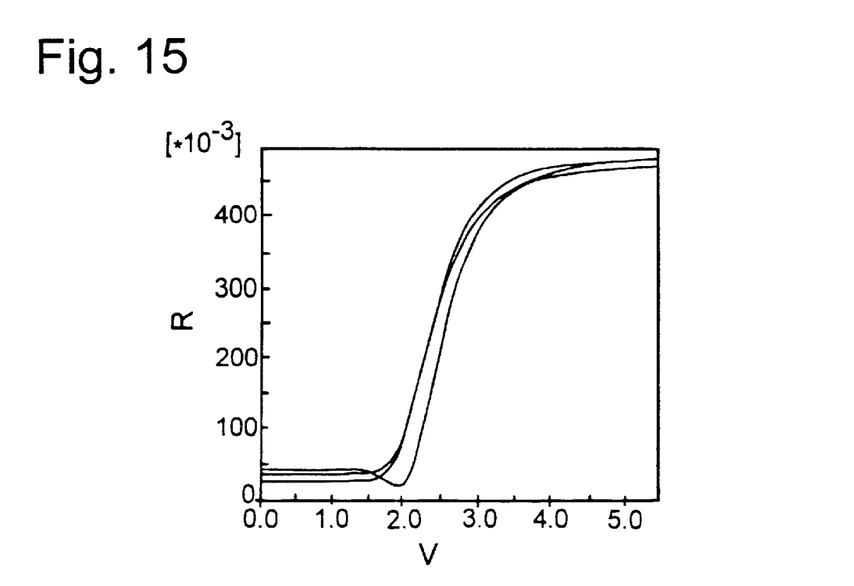
FIG. 15 shows "off"-"on"transition curves for three colours for the display according to the third embodiment of the present invention.

FIGS. 12 and 13 show respectively $\Phi(r)$ and $|\Phi(r0.01)-\Phi(r-0.01)|$ for retardation values from 0.20 to 0.30. We observe that the maximum of $\Phi(r)$ and the minimum of $|\Phi(r+0.01)-\Phi(r-0.01)|$ occur at the retardation value 0.23 which corresponds to maximum "off" state brightness and minimum sensitivity to retardation variation according to the above criteria. FIG. 14 shows the wavelength against reflectance plot for the quiescent state while FIG. 15 shows the "off"-"on" transition curves. Notice the optical inversion in FIG. 15.

For each of the modes (1) to (3), the range of twist angle, polariser angle and retardation can be varied, respectively, by ±3°, ±3° and ±0.03 (rather than by ±2°, ±2° and ±0.02, as above), and still provide superior characteristics. However, with the larger ranges, a background colour may appear on the display. In some applications this can be tolerated.

COMPARATIVE EXAMPLES

Three commonly known existing mixed-mode nematic operating modes are as follows:

(4) 45° twist angle, 22.5° polariser angle, and 0.32 retardation (abbreviated as 45,22.5,0.32 mode)

(5) 60° twist angle, 30° polariser angle, and 0.35 retardation (abbreviated as 60,30,0.35 mode)

(6) 90° twist angle, 20° polariser angle, and 0.24 retardation (abbreviated as 90,20,0.24 mode)

Figure 16:
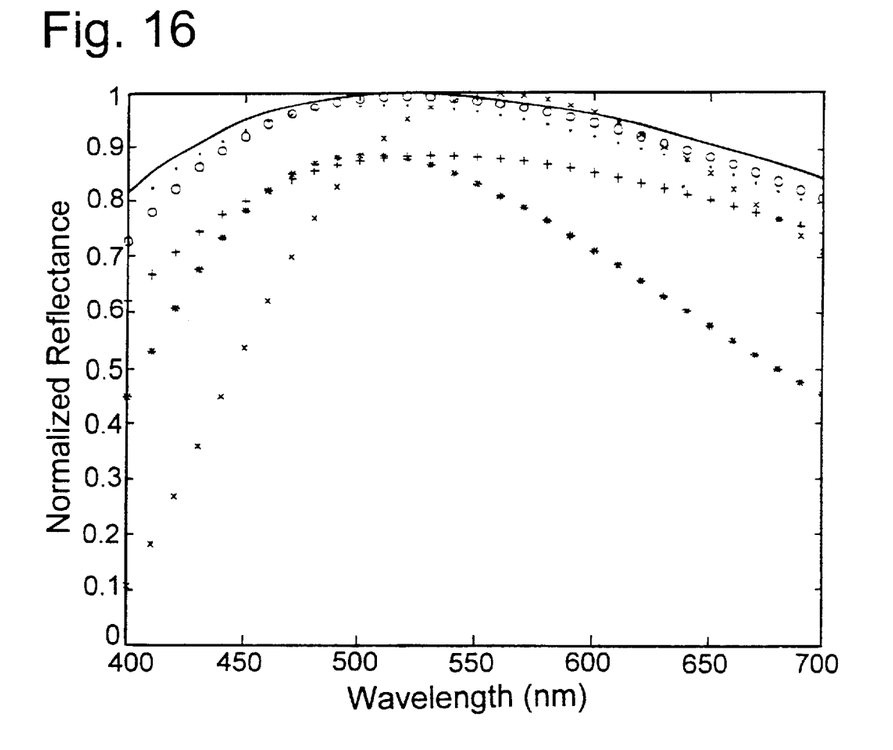
FIG. 16 shows plots of "off"-state wavelength against normalised reflectance for the first, second and third embodiments of the present invention and three comparative examples.

FIG. 16 shows plots of "off" state wavelength against normalised reflectance for modes (1)–(3) according to the present invention and modes (4)–(6) of the Comparative Examples.

In FIG. 16 characteristics of mode (1) are shown with circles "O"; characteristics of mode (2) are shown with solid line "–"; characteristics of mode (3) are shown with dotted line ". . ."; characteristics of mode (4) are shown with asterisks "*"; characteristics of mode (5) are shown with crosses "x"; and characteristics of mode (6) are shown with plus signs "+".

The modes (1)–(3) are superior to the modes (4)–(6) in terms of higher uniformity of response to different wavelengths (broader band) and brightness. The reflectivity of mode (5) reaches the peak at about 550 nm but is very colour dispersive. The modes (4) and (6) are not bright enough.

Figure 17:
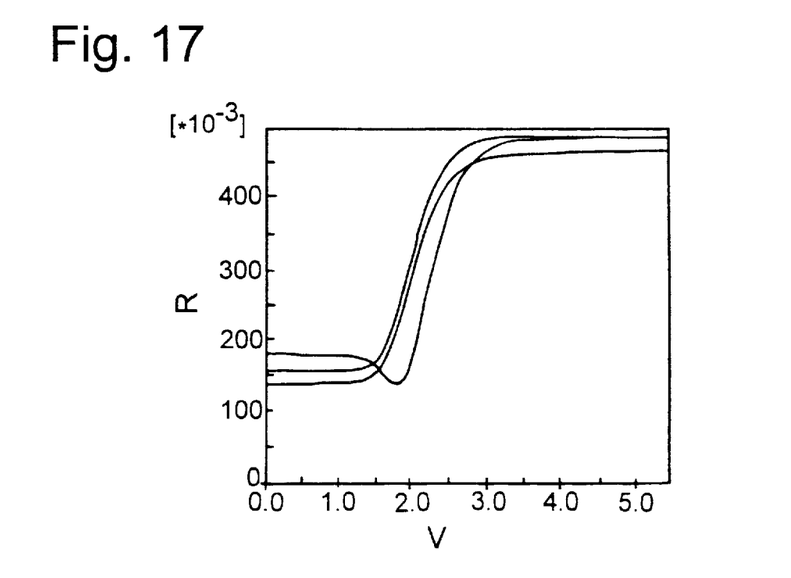
FIG. 17 shows the "off"-"on" transition curves for three colours for the display of a first comparative example.
Figure 18:
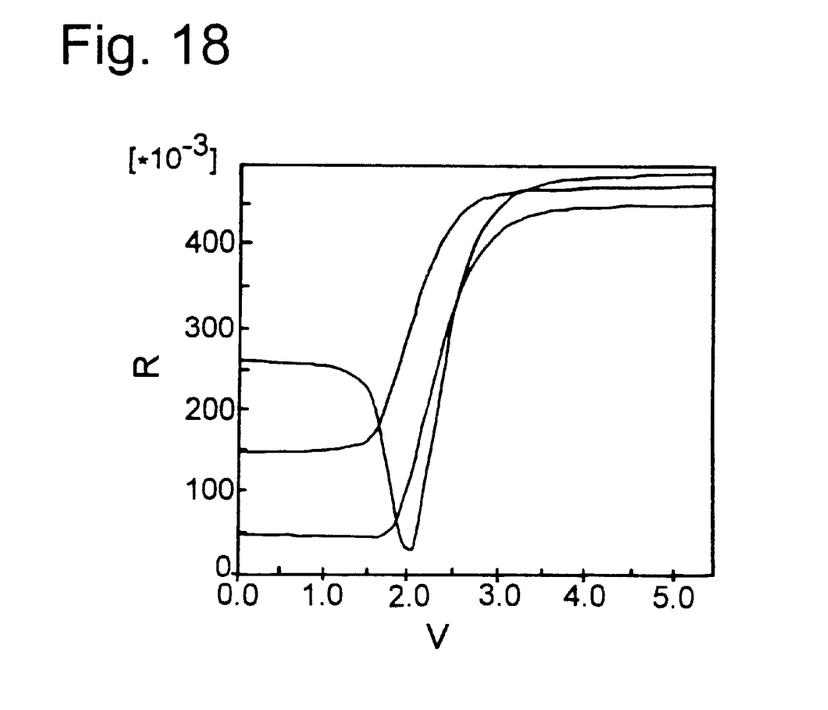
FIG. 18 shows the "off"-"on" transition curves for three colours for a display of a second comparative example.
Figure 19:
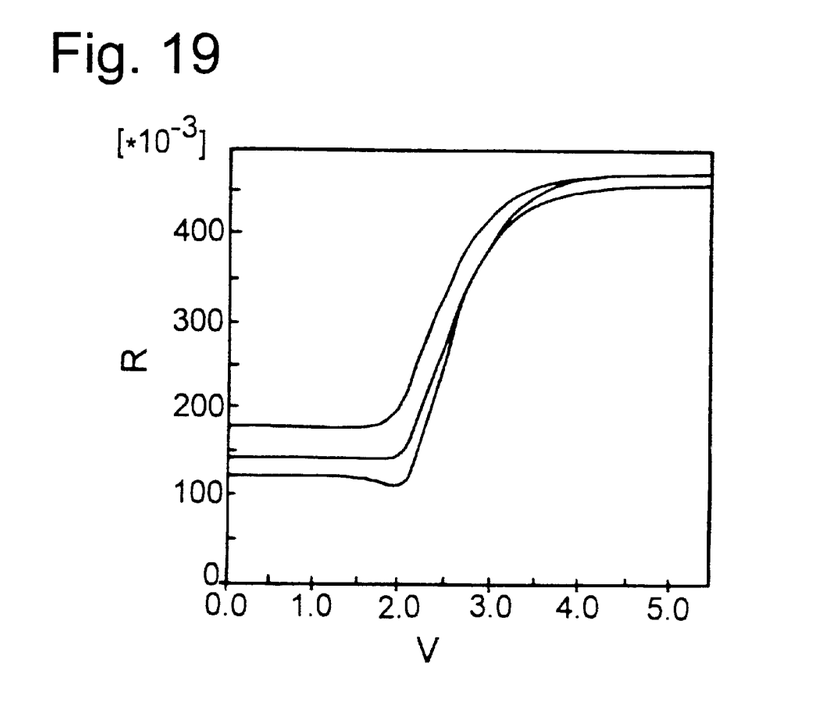
FIG. 19 shows the "off"-"on" transition curves for three colours for a display of a third comparative example.

The following table shows the measures Φ and Ω for the "off" states. It can be observed that the modes (1)–(3) are superior to the modes (4)–(6) in the sense of smaller sensitivity of performance to retardation variation. FIGS. 17, 18 and 19 show the "off"-"on" transition for the modes (4)–(6). It can be seen that modes (4) and (6) are not bright enough in the "off" state while the mode (5) is colour dispersive.

| MODE | | Φ | Ω |
|---|---|---|---|
| (1) | 76, 18.0.25 | 28.2970 | 0.0559 |
| (2) | 70, 8, 0.21 | 29.0755 | 0.1367 |
| (3) | 80, 16, 0.23 | 28.0498 | 0.2258 |
| (4) | 45, 22.5, 0.32 | 21.8945 | 0.4089 |
| (5) | 60, 30, 0.35 | 24.2812 | 1.2732 |
| (6) | 90, 20, 0.24 | 25.2213 | 0.2734 |

The colours used in modes (1)–(3) according to the present invention, and in modes (4)–(6) of the Comparative Examples are 450 nm (light blue) 550 nm (purple) and 650 nm (dark blue).

The present invention may be particularly applicable to reflective microdisplays for direct-view or projection applications. Microdisplays are small, high resolution displays, further details of which can be found on web site WWW-.MICRODISPLAYWEB.COM. One particular microdisplay with which the present invention may be useful is one based on bulk silicon wafer incorporating active matrix with a reflective liquid crystal layer.

What is claimed is:

1. A reflective mixed-mode twisted nematic liquid crystal display device comprising polarising means, a twisted nematic liquid crystal cell and reflecting means, wherein a twist angle is between 73° and 79°, a polariser angle between an alignment direction of a front surface of the liquid crystal cell and a polarisation axis of the polarising means is between 15° and 21°, and a retardation value is between 0.22 μm and 0.28 μm, the retardation value being defined as a product of cell gap and birefringence of the liquid crystal cell.

2. A device according to claim 1, wherein the twist angle is 76°, the polariser angle is 18° and the retardation value is 0.25 μm.

3. A device according to claim 1, wherein the polariser means comprises a polariser.

4. A device according to claim 1, wherein the polariser means comprises a polarising beam splitter.

5. A reflective mixed-mode twisted nematic liquid crystal display device comprising polarising means, a twisted nematic liquid crystal cell and relecting means, wherein a twist angle is between 67° and 73°, a polariser angle between an alignment direction of a front surface of the liquid crystal cell and a polarisation axis of the polarising means is between 5° and 11°, and a retardation value of the liquid crystal cell is between 0.18 μm and 0.24 μm, the retardation value being defined as a product of cell gap and birefringence of the liquid crystal cell.

6. A device according to claim 5, wherein the twist angle is 70°, the polariser angle is 8° and the retardation value is 0.21 μm.

7. A reflective mixed-mode twisted nematic liquid crystal display device comprising polarising means, a twisted nematic liquid crystal cell and reflecting means, wherein a twist angle is between 77° and 83°, a polariser angle between an alignment direction of a front surface of the liquid crystal cell and a polarisation axis of the polarising means is between 13° and 19°, and a retardation value of the liquid crystal cell is between 0.20 μm and 0.26 μm, the retardation value being defined as a product of cell gap and birefringence of the liquid crystal cell.

8. A device according to claim 7, wherein the twist angle is 80°, the polariser angle is 16° and the retardation value is 0.23 μm.

* * * * *